Figure 1:
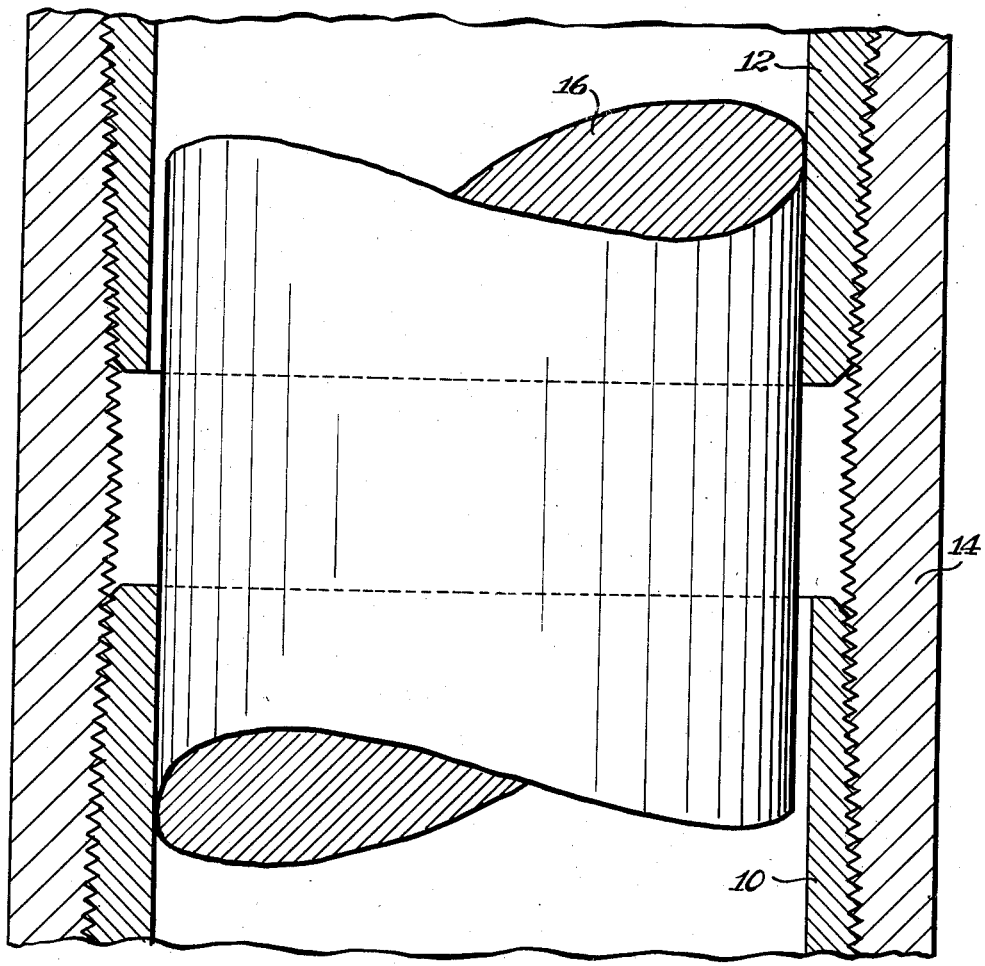

April 11, 1939.   G. M. EATON   2,154,037
METHOD OF MAKING JOINTS
Filed Aug. 15, 1936   3 Sheets-Sheet 1

WITNESSES
A B Wallace
A H Oldham

INVENTOR.
George M. Eaton
BY Brown, Critchlow & Flick
his ATTORNEYS.

April 11, 1939.   G. M. EATON   2,154,037
METHOD OF MAKING JOINTS
Filed Aug. 15, 1936   3 Sheets-Sheet 2

WITNESSES
O B Wallace.
A H Oldham

INVENTOR.
George M. Eaton
BY Brown, Critchlow & Hick
his ATTORNEYS.

April 11, 1939.  G. M. EATON  2,154,037
METHOD OF MAKING JOINTS
Filed Aug. 15, 1936   3 Sheets—Sheet 3

Patented Apr. 11, 1939

2,154,037

UNITED STATES PATENT OFFICE 2,154,037

METHOD OF MAKING JOINTS

George M. Eaton, Ben Avon, Pa., assignor to The National Supply Company, Pittsburgh, Pa., a corporation of Pennsylvania Application August 15, 1936, Serial No. 96,209

2 Claims. (Cl. 29—156)

This invention relates generally to improved joints for securing together tubular members and the methods of making the joints, and is more particularly directed to the manufacture of a threaded joint to be used for connecting oil-well casing together.

This application is a continuation-in-part of my formerly copending application Serial No. 7,212, filed February 19, 1935, and entitled "Joint," which has now matured into Patent No. 2,062,407.

In my referred-to application the various problems attending the manufacture of a satisfactory oil-well casing joint are outlined in considerable detail. As therein stated few more severe and trying conditions on pipe and pipe joints can be found than those normally encountered in casing for oil wells.

For the purpose of the present application the difficulties of present-day manufacture and the resulting product will be considered solely with respect to the matters of strength and inside and outside joint diameters.

More particularly, a large percentage of oil-well casing now employed is seamless tubing which is made by piercing a solid metal billet in a manner familiar to those skilled in the art. While the seamless tube produced has the inherent advantage of being seamless, nevertheless the very characteristics of piercing result in non-uniform wall thickness and non-concentricity of inner and outer surfaces as well as variations in internal and external diameters. As a matter of fact, present well-established standards allow manufacturing tolerances on seamless tubing of plus or minus 12½ per cent on the wall thickness and plus or minus 1 per cent in outside diameter.

The result of such wide tolerances is that when the casing is joined together in individual strings which are nested together in a well to form a casing program the radial clearances between the respective strings and in addition the inside diameters of each string must be sufficiently great to avoid any possibility that the casing will not properly nest or pass a standard American Petroleum Institute (hereinafter specified as A. P. I.) drift which is a metal plug of a certain diameter which must be able to pass through the inside of the pipe. This means that the finishing hole size, i. e., the diameter of the bottoming or inner string of casing is considerably less than the diameter of the outer or surface casing string. Moreover, while A. P. I. clearance requirements are quite high, for reasons just explained, in certain instances the drift may not be able to pass therethrough as hereinafter discussed.

So far as I am aware, no one has ever sought to improve the tolerances of seamless well casing and to insure uniformity of product while decreasing the over-all diameter of the joint. Heretofore the non-uniform wall thickness of the seamless casing often resulted in an unequal amount of metal behind the threaded connection of the joint so that one portion of the joint was quite apt to fail before another portion.

Prior to my invention a small amount of seamless casing has been made with upset ends having threads formed on the upset portion. However, the upsetting operation does not alter the variation in wall thickness of the seamless casing body nor does it fully correct the lack of concentricity at the joint. Therefore, the same problems which have existed with seamless casing in which the thread is formed directly on the end thereof are likewise present in seamless casing having upset ends.

It is the general object of my invention to avoid and overcome the foregoing and other difficulties attending the making and using of oil-well casing and joints therefor by the provision of an improved casing joint having a very uniform and circular internal shape, a concentric and circular outside shape and a uniform wall thickness and an improved method of making the joint.

A more specific object of my invention is the provision of a rapid, efficient and practical process for manufacturing mating joints integral with an oil-well casing body of seamless tubing.

A further object of my invention is the provision of an improved oil-well casing having joints formed on the ends thereof and adapted to pass a standard A. P. I. drift with a clearance less than half of the clearance between the drift and the casing body proper.

Another object of my invention is the provision of an improved joint for oil-well casing having a smaller outside diameter than the corresponding A. P. I. joint and being of increased strength while properly passing the A. P. I. drift.

The foregoing and other objects of my invention are achieved by the provision of a length of oil-well casing having externally and internally upset end portions which are machined concentric to each other and formed with threaded areas complementary to a mating portion of another length of casing. The machining of the inside of the upset end portion is such that the casing will pass a standard A. P. I. drift with a clearance less than half the nominal clearance of the drift in the casing proper.

My improved method includes the steps of exteriorly and interiorly upsetting the ends of the lengths of seamless tubing forming the casing members to be connected, machining each of the upset ends both interiorly and exteriorly to secure inner and outer diameters within close tolerances and to remove decarburized material, and thereafter machining complementary threaded areas on the members.

Figure 2:
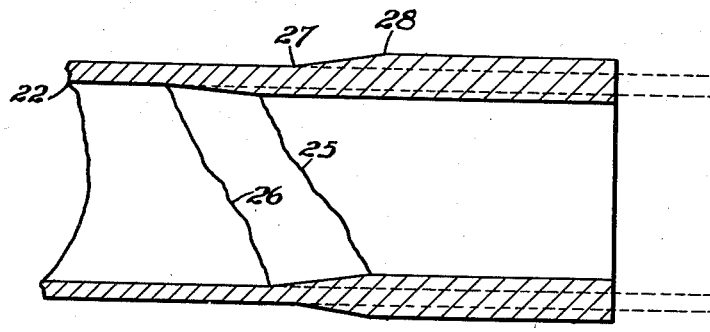
Figure 3:
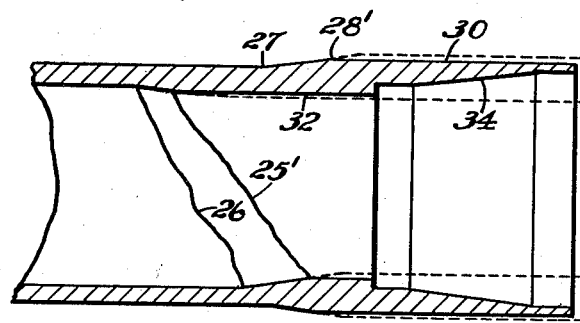
Figure 4:
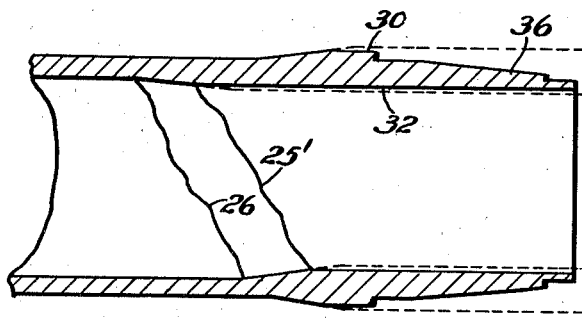
Figure 5:
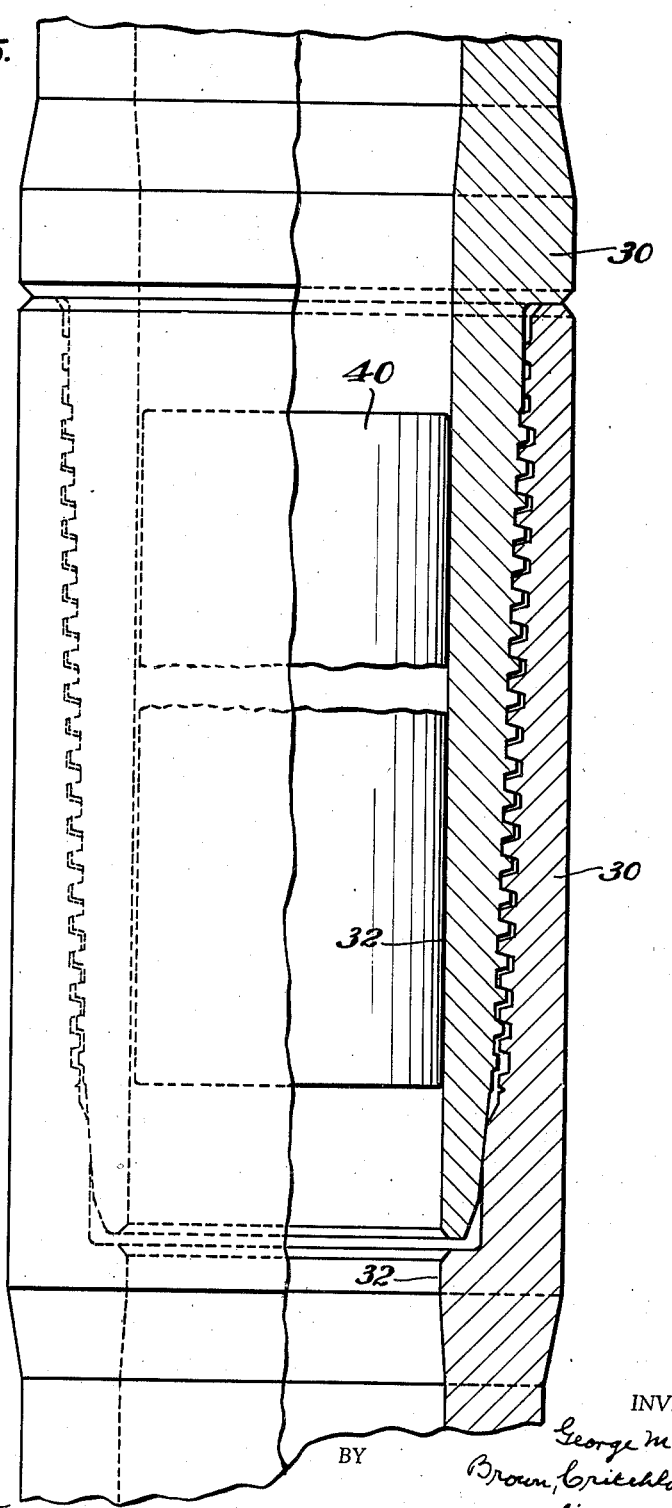

In the accompanying drawings, Fig. 1 illustrates a portion of a standard A. P. I. joint with a standard A. P. I. drift therein; Fig. 2 is a longitudinal sectional view through the end of a casing which in accordance with my invention has been upset interiorly and exteriorly; Figs. 3 and 4 are similar to Fig. 2 except that they illustrate, respectively, the upset pipe ends after a female and male end has been machined therein; and Fig. 5 is an elevation partly in longitudinal section of a finished joint embodying the features of my invention.

For a better understanding of my invention reference should be had to Fig. 1 which strikingly illustrates the disadvantages of prior art practices and the salient features of my advance in the art. In this figure of the drawings the numeral 10 indicates the threaded male end of a piece of standard A. P. I. oil-well casing made from seamless tubing and having an outside diameter of 8⅝" and weighing 43 pounds per foot. The numeral 12 indicates a similar male member, both of the members being threaded into and connected by an internally threaded sleeve 14 also made of seamless tubing. The numeral 16 indicates a standard A. P. I. drift for the 8⅝" casing and this drift has an outside diameter of 7.526". The wall thickness of the casing is .487" and as above indicated A. P. I specifications for seamless casing permit a wall thickness of plus or minus 12½ per cent, in other words, a tolerance of [.487" times 12½%] .061". Thus the wall of the casing 10 or 12 may be .426" [.487" minus .061"] or .548" [.487" plus .061"].

In Fig. 1 I have shown the thickest part of the end of the casing 10 opposite the thinnest part of the end of the casing 12. Such a situation might well occur in the ordinary tonging-up of the joint. Now since the normal outside diameter of the pipe is 8.625" which, less twice the thickest wall, equals 7.529" [8.625" minus 2 times .548"], a clearance of only .003" is left between the inside of the joint and the outside of the standard A. P. I. drift 16 [7.529" minus 7.526"].

However, A. P. I. specifications also permit a tolerance of the outside diameter of the casing of plus or minus 1 per cent. Since 8.625" times 1 per cent equals .086" it will be recognized that where the outside diameter of the casing is near a minimum tolerance limit, the standard A. P. I. drift will not pass through the A. P. I. joint [.003" minus .086" equals negative .083"].

It should be appreciated that the example just given is an extreme case and seldom if ever occurs. However, it does serve to strikingly illustrate the fact that even with relatively large clearances which admittedly increase the outside diameter of the casing and the complete joint sometimes the clearances may not be sufficient. It should also be appreciated that seamless tubing has been employed for oil-well casing for many years with the apparently unsatisfactory results above generally and specifically described and exemplified.

Referring to Figs. 2 to 5 of the drawings, the numeral 22 indicates a seamless tubing in which for purposes of illustration the change in wall thickness has been exaggerated. In my improved process of manufacturing a joint for oil-well casing I first upset the tube 22 from the dotted to the full-line position. Because of the non-uniform wall thickness of the tube and likewise because of the lack of concentricity of the inner and outer surfaces and because of out of roundness, the external and internal upsets terminate in rather irregular lines 25, 26, 27 and 28 as shown in Fig. 2. I then machine the external upset and bore out the internal upset to form substantially concentric surfaces 30 and 32. These machining operations are performed while holding the pipe in an unchanged chuck grip on the outer surface of the pipe, thus insuring that the surface 32 which is machined first will be concentric therewith. The machining of surface 32 moves runout line 25 to 25'. The outer portion of the upset without release from the chuck grip is next machined down to the surface 30 moving runout line 28 to 28' and insuring concentricity of surfaces 30 and 32.

An important feature of my invention is to remove all metal from the surface of the upset which has been decarburized in any of the manufacturing steps up to machining. Thus the machining operations, to form surfaces 30 and 32, are carefully controlled to provide concentricity, and the desired wall thickness, and to remove the decarburized surface metal thereby leaving the stronger base stock and providing material in the critical region having a higher yield point.

As illustrated in Figs. 3 and 4, the machined upset portions are now further machined to form either a female surface 34 or a male surface 36. These surfaces then are provided with complementary threads and sealing surfaces, as for example, of the character described heretofore to complete the joint.

The internal diameter of the joint as defined by the surface 32 is very carefully machined, as described, to relatively close limits so that the standard A. P. I. drift can be passed therethrough. The amount of upset and machining is carefully predetermined so that the clearance between the drift and the internal bore of the joint is less than about one-half of the nominal clearance between the drift and the inside of the casing proper, i. e., the tube 22. By correlating the factors involved the very close clearance between the internal bore 32 of the joint and the standard drift allows the external surface 30 of the joint to be formed to very close limits so that the outside diameter of the joint is substantially at a minimum.

Fig. 5 illustrates my improved finished and made-up joint and a standard A. P. I. drift 40 is shown being passed through the joint with a clearance of approximately .015" in smaller sizes up to .026" in larger sizes, whereas the clearance between the drift and the wall of the casing proper is approximately .03" to .10" over the various sizes.

As above stated, a novel and important feature of my invention is that with the improved method of forming joints as herein described the external diameter of the joint can be kept at a minimum and the internal diameter at a maximum. These dimensions are crucial in oil-well casing because I am thereby able to start a well with a smaller hole than is possible when using standard A. P. I. casing. This noticeably reduces drilling costs by reducing the amount of material that has to be pulverized and raised to the surface, the total weight of casing is cut, smaller drill bits can be used, etc.

As a concrete illustration of the relative outside diameters and tensile efficiency (strength of joint divided by strength of pipe body proper) of my joint and a standard A. P. I. coupling, the following table has been made up from joints actually manufactured and tested:

| Pipe size | Outside diameter | | | Tensile efficiency of joint | | |
|---|---|---|---|---|---|---|
| | A | B | A—B | A | B | B/A |
| | A. P. I. coupling | My new joint | Reduction | A. P. I. | My new joint | Improvement |
| | | | | | Per cent | |
| 5½ | 6.050 | 5.916 | .134 | Short coupling 61.5% | 100 | 1.63 |
| 7 | 7.750 | 7.308 | .442 | Long coupling 71.0% | 86 | 1.21 |
| 7⅝ | 8.500 | 7.930 | .570 | Long coupling 68% | 86.7 | 1.27 |

The reduction in outside diameter of my improved joint without reduction of strength is of utmost importance and results in a material saving in drilling costs. It is due largely to machining within close tolerances of the character specified and sharply distinguishes from standard A. P. I. practice. The improved joint produced likewise has a circumferential uniformity of metal backing the mating threads of the joint. This results in even stresses over the entire joint and prevents joint failure from stress concentration. The particular type of joint manufactured and its efficiency can be readily controlled by the degree of upsetting and machining employed and results in a much more uniform product than that heretofore known.

While in accordance with the patent statutes one embodiment of my invention has been illustrated and described in detail, it should be appreciated that the invention is not limited thereto or thereby but is defined in the appended claims.

I claim:

1. That method of making a mating seamless oil-well casing end which includes the steps of upsetting the interior and exterior of a seamless casing end, boring out the interior upset portion concentric to the outer casing surface and to the desired internal diameter, machining the exterior upset portion concentric to the machined internal surface and to the desired outside diameter, further machining at least one of the machined surfaces to a complementary contour and threading the contour, and correlating the upsetting and machining operations so that the internal machined surface of the casing end will pass a standard A. P. I. drift with a clearance of less than about .03" and the internal surface of the casing will pass the drift with a nominal clearance at least approximately twice the clearance at the joint.

2. That method of making a threaded connection for a length of seamless oil well casing which comprises upsetting an end of the casing so as to decrease the internal diameter and increase the external diameter thereof, boring out the interior of the upset end, machining the exterior surface of the upset end concentric to the bored interior surface, further machining at least one of the machined surfaces to a complementary contour, threading the contour, and correlating the upsetting and machining operations so that the internal machined surface of the casing end will pass a standard A. P. I. drift with a clearance less than about one-half the nominal clearance of the drift in the casing proper.

GEORGE M. EATON.